United States Patent
Brauch et al.

(10) Patent No.: US 10,241,810 B2
(45) Date of Patent: Mar. 26, 2019

(54) INSTRUCTION-OPTIMIZING PROCESSOR WITH BRANCH-COUNT TABLE IN HARDWARE

(75) Inventors: Rupert Brauch, Sunnyvale, CA (US); Madhu Swarna, Portland, OR (US); Ross Segelken, Portland, OR (US); David Dunn, Sammamish, WA (US); Ben Hertzberg, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 953 days.

(21) Appl. No.: 13/475,755

(22) Filed: May 18, 2012

(65) Prior Publication Data
US 2013/0311752 A1    Nov. 21, 2013

(51) Int. Cl.
*G06F 9/30* (2018.01)
*G06F 9/455* (2018.01)

(52) U.S. Cl.
CPC ...... *G06F 9/45516* (2013.01); *G06F 9/30174* (2013.01)

(58) Field of Classification Search
CPC .................................................. G06F 9/30174
See application file for complete search history.

(56) References Cited

U.S. PATENT DOCUMENTS

| | | |
|---|---|---|
| 3,815,101 A | 6/1974 | Boss et al. |
| 3,950,729 A | 4/1976 | Fletcher et al. |
| 4,654,790 A | 3/1987 | Woffinden |
| 4,797,814 A | 1/1989 | Brenza |
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |
| 5,487,146 A | 1/1996 | Guttag et al. |
| 5,526,504 A | 6/1996 | Hsu et al. |

(Continued)

FOREIGN PATENT DOCUMENTS

| | | |
|---|---|---|
| CN | 1390329 A | 1/2003 |
| CN | 1519728 A | 8/2004 |

(Continued)

OTHER PUBLICATIONS

Rozas, Guillermo J. et al., "Queued Instruction Re-Dispatch After Runahead," U.S. Appl. No. 13/730,407, filed Dec. 28, 2012, 36 pages.

(Continued)

*Primary Examiner* — Jacob Petranek
(74) *Attorney, Agent, or Firm* — Brian Lee; Parker Justiss, P.C.

(57) ABSTRACT

A processing system comprising a microprocessor core and a translator. Within the microprocessor core is arranged a hardware decoder configured to selectively decode instructions for execution in the microprocessor core, and, a logic structure configured to track usage of the hardware decoder. The translator is operatively coupled to the logic structure and configured to selectively translate the instructions for execution in the microprocessor core, based on the usage of the hardware decoder as determined by the logic structure.

18 Claims, 7 Drawing Sheets

(56) References Cited

U.S. PATENT DOCUMENTS

| | | | |
|---|---|---|---|
| 5,649,102 A | 7/1997 | Yamauchi et al. | |
| 5,649,184 A | 7/1997 | Hayashi et al. | |
| 5,696,925 A | 12/1997 | Koh | |
| 5,721,855 A | 2/1998 | Hinton et al. | |
| 5,870,582 A | 2/1999 | Cheong et al. | |
| 5,949,785 A | 9/1999 | Beasley | |
| 5,956,753 A | 9/1999 | Glew et al. | |
| 5,963,984 A | 10/1999 | Garibay, Jr. et al. | |
| 5,999,189 A | 12/1999 | Kajiya et al. | |
| 6,012,132 A | 1/2000 | Yamada et al. | |
| 6,031,992 A * | 2/2000 | Cmelik et al. | 717/138 |
| 6,091,897 A | 7/2000 | Yates et al. | |
| 6,091,987 A | 7/2000 | Thompson | |
| 6,118,724 A | 9/2000 | Higginbottom | |
| 6,297,832 B1 | 10/2001 | Mizuyabu et al. | |
| 6,298,390 B1 | 10/2001 | Matena et al. | |
| 6,362,826 B1 | 3/2002 | Doyle et al. | |
| 6,457,115 B1 | 9/2002 | McGrath | |
| 6,470,428 B1 | 10/2002 | Milway et al. | |
| 6,499,090 B1 | 12/2002 | Hill et al. | |
| 6,519,694 B2 | 2/2003 | Harris | |
| 6,549,997 B2 | 4/2003 | Kalyanasundharam | |
| 6,636,223 B1 | 10/2003 | Morein | |
| 6,658,538 B2 | 12/2003 | Arimilli et al. | |
| 6,711,667 B1 * | 3/2004 | Ireton | 712/35 |
| 6,714,904 B1 | 3/2004 | Torvalds et al. | |
| 6,742,104 B2 | 5/2004 | Chauvel et al. | |
| 6,751,583 B1 | 6/2004 | Clarke et al. | |
| 6,813,699 B1 | 11/2004 | Belgard | |
| 6,823,433 B1 | 11/2004 | Barnes et al. | |
| 6,839,813 B2 | 1/2005 | Chauvel | |
| 6,859,208 B1 | 2/2005 | White | |
| 6,877,077 B2 | 4/2005 | McGee et al. | |
| 6,883,079 B1 | 4/2005 | Priborsky | |
| 6,950,925 B1 | 9/2005 | Sander et al. | |
| 6,978,462 B1 | 12/2005 | Adler et al. | |
| 6,981,083 B2 | 12/2005 | Arimilli et al. | |
| 7,007,075 B1 | 2/2006 | Coffey | |
| 7,010,648 B2 | 3/2006 | Kadambi et al. | |
| 7,062,631 B1 | 6/2006 | Klaiber et al. | |
| 7,082,508 B2 | 7/2006 | Khan et al. | |
| 7,107,411 B2 | 9/2006 | Burton et al. | |
| 7,107,441 B2 | 9/2006 | Zimmer et al. | |
| 7,117,330 B1 | 10/2006 | Alverson et al. | |
| 7,120,715 B2 | 10/2006 | Chauvel et al. | |
| 7,124,327 B2 | 10/2006 | Bennett et al. | |
| 7,139,876 B2 | 11/2006 | Hooker | |
| 7,159,095 B2 | 1/2007 | Dale et al. | |
| 7,162,612 B2 | 1/2007 | Henry et al. | |
| 7,191,349 B2 | 3/2007 | Kaushik et al. | |
| 7,194,597 B2 | 3/2007 | Willis et al. | |
| 7,194,604 B2 | 3/2007 | Bigelow et al. | |
| 7,203,932 B1 | 4/2007 | Gaudet et al. | |
| 7,225,355 B2 | 5/2007 | Yamazaki et al. | |
| 7,234,038 B1 | 6/2007 | Durrant | |
| 7,275,246 B1 | 9/2007 | Yates, Jr. et al. | |
| 7,310,722 B2 | 12/2007 | Moy et al. | |
| 7,340,582 B2 | 3/2008 | Madukkarumukumana et al. | |
| 7,340,628 B2 | 3/2008 | Pessolano | |
| 7,401,358 B1 | 7/2008 | Christie et al. | |
| 7,406,585 B2 | 7/2008 | Rose et al. | |
| 7,447,869 B2 | 11/2008 | Kruger et al. | |
| 7,519,781 B1 | 4/2009 | Wilt | |
| 7,545,382 B1 | 6/2009 | Montrym et al. | |
| 7,702,843 B1 | 4/2010 | Chen et al. | |
| 7,730,489 B1 | 6/2010 | Duvur et al. | |
| 7,752,627 B2 | 7/2010 | Jones et al. | |
| 7,873,793 B1 | 1/2011 | Rozas et al. | |
| 7,890,735 B2 | 2/2011 | Tran | |
| 7,921,300 B2 | 4/2011 | Crispin et al. | |
| 7,925,923 B1 | 4/2011 | Hyser et al. | |
| 8,035,648 B1 | 10/2011 | Wloka et al. | |
| 8,190,863 B2 | 5/2012 | Fossum et al. | |
| 8,364,902 B2 | 1/2013 | Hooker et al. | |
| 8,533,437 B2 | 9/2013 | Henry et al. | |
| 8,549,504 B2 | 10/2013 | Breternitz, Jr. et al. | |
| 8,621,120 B2 | 12/2013 | Bender et al. | |
| 8,706,975 B1 | 4/2014 | Glasco et al. | |
| 8,707,011 B1 | 4/2014 | Glasco et al. | |
| 8,762,127 B2 | 6/2014 | Winkel et al. | |
| 9,384,001 B2 | 7/2016 | Hertzberg et al. | |
| 9,547,602 B2 | 1/2017 | Klaiber et al. | |
| 2001/0049818 A1 * | 12/2001 | Banerjia et al. | 717/9 |
| 2002/0004823 A1 | 1/2002 | Anderson et al. | |
| 2002/0013889 A1 | 1/2002 | Schuster et al. | |
| 2002/0099930 A1 * | 7/2002 | Sakamoto et al. | 712/227 |
| 2002/0108103 A1 | 8/2002 | Nevill | |
| 2002/0169938 A1 | 11/2002 | Scott et al. | |
| 2002/0172199 A1 | 11/2002 | Scott et al. | |
| 2003/0014609 A1 | 1/2003 | Kissell | |
| 2003/0018685 A1 | 1/2003 | Kalafatis et al. | |
| 2003/0033507 A1 | 2/2003 | McGrath | |
| 2003/0120892 A1 | 6/2003 | Hum et al. | |
| 2003/0140245 A1 | 7/2003 | Dahan et al. | |
| 2003/0167420 A1 | 9/2003 | Parsons | |
| 2003/0172220 A1 | 9/2003 | Hao | |
| 2003/0196066 A1 | 10/2003 | Mathews | |
| 2003/0236771 A1 | 12/2003 | Becker | |
| 2004/0025161 A1 | 2/2004 | Chauvel et al. | |
| 2004/0054833 A1 | 3/2004 | Seal et al. | |
| 2004/0078778 A1 | 4/2004 | Leymann et al. | |
| 2004/0122800 A1 | 6/2004 | Nair et al. | |
| 2004/0128448 A1 | 7/2004 | Stark et al. | |
| 2004/0153350 A1 | 8/2004 | Kim et al. | |
| 2004/0168042 A1 | 8/2004 | Lin | |
| 2004/0193831 A1 | 9/2004 | Moyer | |
| 2004/0215918 A1 | 10/2004 | Jacobs et al. | |
| 2004/0225869 A1 | 11/2004 | Pagni et al. | |
| 2004/0268071 A1 | 12/2004 | Khan et al. | |
| 2005/0050013 A1 | 3/2005 | Ferlitsch | |
| 2005/0055533 A1 | 3/2005 | Kadambi et al. | |
| 2005/0086650 A1 | 4/2005 | Yates, Jr. et al. | |
| 2005/0097276 A1 | 5/2005 | Lu et al. | |
| 2005/0097280 A1 | 5/2005 | Hofstee et al. | |
| 2005/0138332 A1 | 6/2005 | Kottapalli et al. | |
| 2005/0154831 A1 | 7/2005 | Steely, Jr. et al. | |
| 2005/0154867 A1 | 7/2005 | DeWitt, Jr. et al. | |
| 2005/0207257 A1 | 9/2005 | Skidmore | |
| 2005/0268067 A1 | 12/2005 | Lee et al. | |
| 2006/0004984 A1 | 1/2006 | Morris et al. | |
| 2006/0010309 A1 | 1/2006 | Chaudhry et al. | |
| 2006/0069879 A1 | 3/2006 | Inoue et al. | |
| 2006/0069899 A1 | 3/2006 | Schoinas et al. | |
| 2006/0095678 A1 | 5/2006 | Bigelow et al. | |
| 2006/0149931 A1 | 7/2006 | Haitham et al. | |
| 2006/0174228 A1 | 8/2006 | Radhakrishnan et al. | |
| 2006/0187945 A1 | 8/2006 | Andersen | |
| 2006/0190671 A1 | 8/2006 | Jeddeloh | |
| 2006/0195683 A1 | 8/2006 | Kissell | |
| 2006/0230223 A1 | 10/2006 | Kruger et al. | |
| 2006/0259732 A1 | 11/2006 | Traut et al. | |
| 2006/0259744 A1 | 11/2006 | Matthes | |
| 2006/0259825 A1 | 11/2006 | Cruickshank et al. | |
| 2006/0277398 A1 | 12/2006 | Akkary et al. | |
| 2006/0282645 A1 | 12/2006 | Tsien | |
| 2006/0288174 A1 | 12/2006 | Nace et al. | |
| 2007/0067505 A1 | 3/2007 | Kaniyur et al. | |
| 2007/0073996 A1 | 3/2007 | Kruger et al. | |
| 2007/0106874 A1 | 5/2007 | Pan et al. | |
| 2007/0126756 A1 | 6/2007 | Glasco et al. | |
| 2007/0157001 A1 | 7/2007 | Ritzau | |
| 2007/0168634 A1 | 7/2007 | Morishita et al. | |
| 2007/0168643 A1 | 7/2007 | Hummel et al. | |
| 2007/0204137 A1 | 8/2007 | Tran | |
| 2007/0234358 A1 * | 10/2007 | Hattori | G06F 9/45533 718/1 |
| 2007/0240141 A1 | 10/2007 | Qin et al. | |
| 2008/0141011 A1 | 6/2008 | Zhang et al. | |
| 2008/0172657 A1 | 7/2008 | Bensal et al. | |
| 2008/0263284 A1 | 10/2008 | da Silva et al. | |
| 2009/0019317 A1 | 1/2009 | Quach et al. | |
| 2009/0204785 A1 | 8/2009 | Yates, Jr. et al. | |
| 2009/0327661 A1 | 12/2009 | Sperber et al. | |
| 2009/0327673 A1 | 12/2009 | Yoshimatsu et al. | |

(56) References Cited

U.S. PATENT DOCUMENTS

| | | | |
|---|---|---|---|
| 2010/0161901 | A9 | 6/2010 | Williamson et al. |
| 2010/0205402 | A1 | 8/2010 | Henry et al. |
| 2010/0205415 | A1 | 8/2010 | Henry et al. |
| 2010/0217936 | A1 | 8/2010 | Carmichael et al. |
| 2010/0306503 | A1 | 12/2010 | Henry et al. |
| 2011/0078425 | A1 | 3/2011 | Shah et al. |
| 2011/0153307 | A1 | 6/2011 | Winkel et al. |
| 2011/0307876 | A1 | 12/2011 | Ottoni et al. |
| 2012/0023359 | A1 | 1/2012 | Edmeades et al. |
| 2012/0089819 | A1 | 4/2012 | Chaudhry et al. |
| 2012/0198157 | A1 | 8/2012 | Abdallah |
| 2013/0198458 | A1 | 8/2013 | Winkel et al. |
| 2013/0219370 | A1* | 8/2013 | Beale et al. ............... 717/128 |
| 2013/0246709 | A1 | 9/2013 | Segelken et al. |
| 2013/0275684 | A1 | 10/2013 | Tuck et al. |
| 2013/0311752 | A1 | 11/2013 | Brauch et al. |
| 2014/0019723 | A1* | 1/2014 | Yamada et al. ............... 712/208 |
| 2014/0052962 | A1 | 2/2014 | Hertzberg et al. |
| 2014/0082291 | A1 | 3/2014 | Van Zoeren et al. |
| 2014/0136891 | A1 | 5/2014 | Holmer et al. |
| 2014/0189310 | A1 | 7/2014 | Tuck et al. |
| 2014/0281259 | A1 | 9/2014 | Klaiber et al. |
| 2014/0281392 | A1 | 9/2014 | Tuck et al. |
| 2015/0026443 | A1 | 1/2015 | Kumar et al. |

FOREIGN PATENT DOCUMENTS

| | | | |
|---|---|---|---|
| CN | 1629799 | A | 6/2005 |
| CN | 1682181 | A | 10/2005 |
| CN | 1823322 | A | 8/2006 |
| CN | 1831757 | A | 9/2006 |
| CN | 101042670 | A | 9/2007 |
| CN | 101110074 | A | 1/2008 |
| CN | 100378618 | C | 4/2008 |
| CN | 101984403 | A | 3/2011 |
| CN | 102110011 | A | 6/2011 |
| DE | 102013218370 | A1 | 3/2014 |
| EP | 0671718 | | 9/1995 |
| EP | 1557754 | | 7/2005 |
| GB | 2287111 | | 9/1995 |
| GB | 2404043 | | 1/2005 |
| GB | 2404044 | | 1/2005 |
| JP | 02288927 | | 11/1990 |
| JP | 03054660 | | 3/1991 |
| JP | 04182858 | | 6/1992 |
| TW | 200401187 | A | 1/2004 |
| TW | I232372 | | 5/2005 |
| TW | I233545 | B | 6/2005 |
| TW | 200537886 | A | 11/2005 |
| TW | I263938 | | 10/2006 |
| TW | I275938 | B | 3/2007 |
| TW | 200723111 | A | 6/2007 |
| TW | I282230 | B | 6/2007 |
| TW | I284281 | B | 7/2007 |
| TW | 200809514 | A | 2/2008 |
| TW | I315488 | | 10/2009 |
| TW | I315846 | | 10/2009 |
| TW | 201106264 | A | 2/2011 |
| TW | 201135460 | A | 10/2011 |
| TW | 201220183 | | 5/2012 |
| TW | 1425418 | | 2/2014 |
| WO | 2012103209 | | 8/2012 |

OTHER PUBLICATIONS

Adve, S. et al., "Shared Memory Consistency models: A Turorial", WRL Research Report 95/7, Western Digital Laboratory, Sep. 1995, 32 pages.

Chaudhuri, "The impact of NACKs in shared memory scientific applications", Feb. 2004, IEEE, IEEE Transactions on Parallel and distributed systems vol. 15, No. 2, p. 134-150.

Chaudry, S. et al., "High-Performance Throughput Computing," Micro, IEEE 25.3, pp. 32-45, May 2005, 14 pages.

Dehnert et al., "The Transmeta Code MorphingTM Software: Using Speculation, Recovery, and Adaptive Retranslation to Address Real-Life Challenges," Mar. 23, 2003, IEEE, CGO '03 Proceedings of the International Symposium on Code generation and optimization: feedback-directed and runtime optimization, pp. 15-24.

Dundas, J. et al., "Improving Date Cache Performance by Pre-executing Instructions Under a Cache Miss", Proceedings of the 1997 International Conference on Supercomputing, Jul. 1997, 9 pages.

Ekman, M. et al., "Instruction Categorization for Runahead Operation", U.S. Appl. No. 13/708,544, filed Dec. 7, 2012, 32 Pages.

Ekman, M. et al., "Selective Poisoning of Data During Runahead", U.S. Appl. No. 13/662,171, filed Oct. 26, 2012, 33 pages.

Guelfi et al., (Rapid Integration of Software Engineering Techniques) 2005, Second International Workshop, 9 pages.

Harper et al., (Rapid recovery from transient Faults n the fault tolerant processor with fault-tolerant shared memory) 1990, IEEE, p. 350-359.

Holmer, B., et al., "Managing Potentially Invalid Results During Runahead", U.S. Appl. No. 13/677,085, filed Nov. 14, 2012, 29 pages.

Mutlu, O. et al. "Runahead Execution: An Alternative to Very large Instruction Windows for Out-of-order Processors," This paper appears in: "High-Performance Computer Architecture," Feb. 8-12, 2003, 13 pages.

Wikipedia, Physical Address, Apr. 17, 2010, pp. 1-2, www.wikipedia.com.

Ooi, (Fault Tolerant Architecture in a cache memory control LSI), 1992, IEEE, 507-514.

Oracle, (Oracle 8i Parallel server), 1999, Oracle, Release 2 (8.1.6) 1-216.

Osronline, (The Basics: So what is a Page fault?), http://www.osronline.com/article.cfm?article=222, May 5, 2003, p. 1-2.

PC Magazine (Definition of: Page Fault) PCMag.com, Mar. 27, 2009.

Rotenberg et al., "A Trace Cache Microarchitecture and Evaluation," IEEE Transactions on Computers, vol. 48, No. 2, Feb. 1999, 10 pages.

Rotenberg et al., "Trace Cache: a Low Latency Approach to High Bandwidth Instruction Fetching," Proceedings of th 29th Annual International Symposium on Microarchitecture, Dec. 2-4, 1996, Paris, France, IEEE, 12 pages.

Rotenberg et al., "Trace Cache: a Low Latency Approach to High Bandwidth Instruction Fetching," <http://people.engr.ncsu.edu/ericro/publications/techreport_MICRO-29_rbs.pdf>, Apr. 11, 1996, 48 pages.

Rozas, J. et al., "Lazy Runahead Operation for a Microprocessor", U.S. Appl. No. 13/708,645, filed Dec. 7, 2012, 32 pages.

Shalan, (Dynamic Memory Management for embedded real-time multiprocessor system on a chip), 2000, ACM, 180-186.

Shalan, (Dynamic Memory Management for embedded real-time multiprocessor system on a chip), 2003, Georgia Inst. Of Tech. 1-118.

Wikipedia article, "Instruction Prefetch," https://en.wikipedia.org/wiki/Instruction_prefetch, downloaded May 23, 2016.

Wikipedia article, "x86," https://en.wikipedia.org/wiki/X86, downloaded May 23, 2016.

Wikipedia, (CPU Cache definition), Wikipedia, Jan. 26, 2010, pp. 1-16.

Wikipedia, (Page Fault definition), Wikipedia, Mar. 9, 2009, pp. 1-4.

Wikipedia, Memory Address, Oct. 29, 2010, pp. 1-4, www.wikipedia.com.

Intel Itanium Architecture Software Develope's Manual, Intel, http://www.intel.com/design/itanium/manuals/iasdmanual.htm, Mar. 8, 2013, 1 page.

Laibinis, et al., "Formal Development of Reactive Fault Tolerant Systems", Sep. 9, 2005, Springer, Second Workshop, RISE 2005, p. 234-249.

* cited by examiner

INSTRUCTION-OPTIMIZING PROCESSOR WITH BRANCH-COUNT TABLE IN HARDWARE

BACKGROUND

A central processing unit (CPU) or graphics processing unit (GPU) of a computer may include a microprocessor. The microprocessor may be configured to execute code compiled to its native instruction-set architecture (ISA) in addition to certain non-native ISAs.

When the microprocessor encounters non-native instructions, blocks of the non-native instructions may be converted to native instructions and may also be optimized—e.g., to increase speed of execution. Optimized blocks of native instructions corresponding to the original non-native instructions may be stored in an instruction cache for future use. However, code optimization may require significant computational effort. Optimizing every code block encountered by the microprocessor may present an unacceptable performance overhead in some systems.

DETAILED DESCRIPTION

Aspects of this disclosure will now be described by example and with reference to the illustrated embodiments listed above. Components that may be substantially the same in one or more embodiments are identified coordinately and are described with minimal repetition. It will be noted, however, that elements identified coordinately may also differ to some degree. The claims appended to this description uniquely define the subject matter claimed herein. The claims are not limited to the example structures or numerical ranges set forth below, nor to implementations that address the herein-identified problems or disadvantages of the current state of the art.

Figure 1:
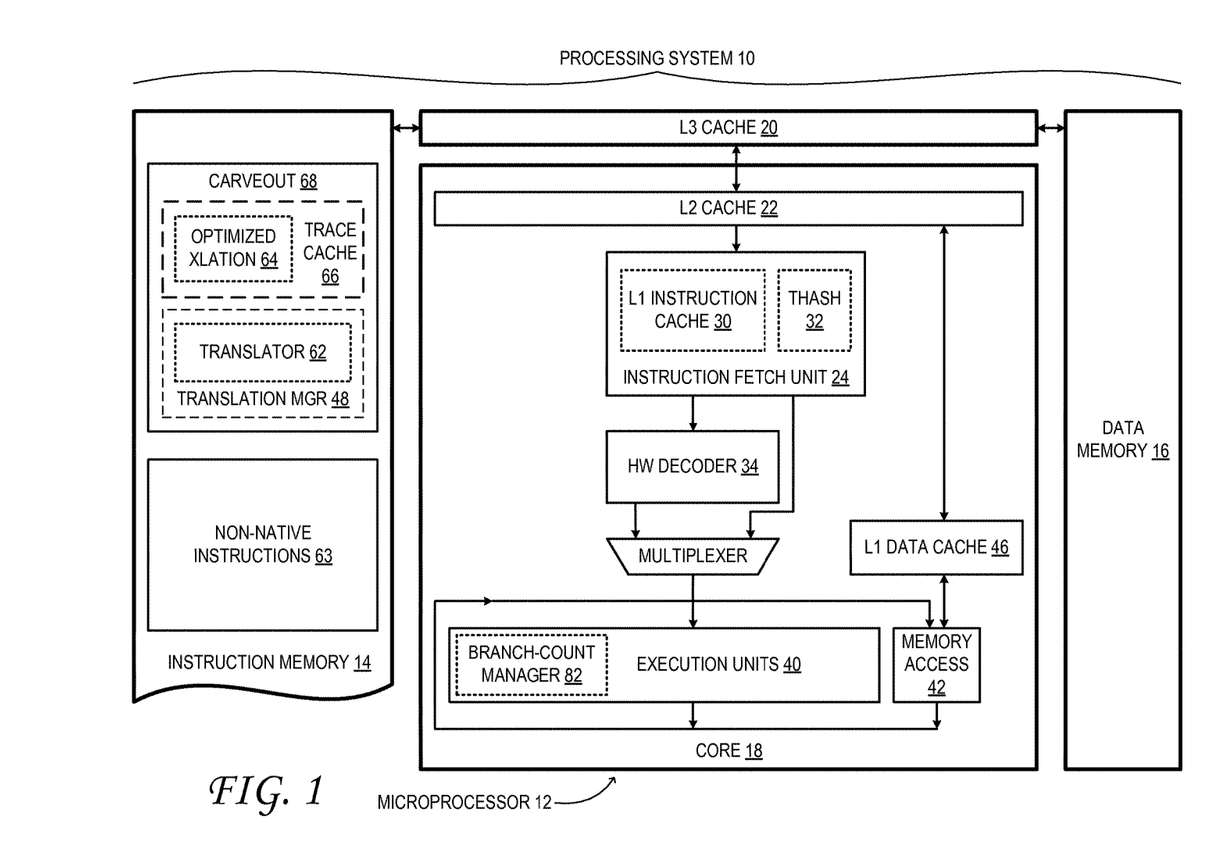
FIG. 1 schematically shows an example processing system in accordance with an embodiment of this disclosure.

FIG. 1 shows aspects of an example processing system 10—a central processing unit or graphics processing unit of a personal computer, game system, or smartphone, for example. The illustrated processing system includes microprocessor 12, which is operatively coupled to instruction memory 14 and to data memory 16. The microprocessor of FIG. 1 includes core 18. Although the drawing shows only one microprocessor core, every aspect of this disclosure is consistent with multi-core processors and processing systems.

Instruction memory 14 and data memory 16 may each be readable and writable by the microprocessor through a hierarchical memory cache system. In the illustrated embodiment, the memory cache system includes an off-core, level-three (L3) cache 20 and an on-core, level-two (L2) cache 22, in addition to instruction- and data-specific level-one (L1) caches, as described below. In other embodiments, the memory cache system may include any number of levels, with the levels residing on- or off-chip. The memory cache system may be operatively coupled to a memory controller (not shown in the drawings) which can also be on- or off-chip. Embodied in random-access memory of any suitable variant, the instruction and data memories may correspond to different physical memory structures or to different parts of the same physical memory structure. In some embodiments, the instruction and data memories may also include read-only memory (ROM).

Continuing in FIG. 1, core 18 includes instruction fetch unit (IFU) 24, which is configured to retrieve instructions from instruction memory 14. The instruction to be retrieved at any given time may be determined by the current instruction pointer (IP), for example. In the embodiment illustrated in FIG. 1, the IFU includes L1 instruction cache 30 for caching the instructions retrieved. The IFU may also include translation-address cache (THASH) 32, which is described hereinafter.

IFU 24 may be configured to retrieve instruction code of various forms. In addition to instructions natively executable by the execution units of core 18, the instruction fetch unit may also retrieve instructions compiled to a non-native instruction set architecture (ISA). Such non-native instructions may require decoding or translation into the native ISA to be recognized by the execution units. To this end, processing system 10 includes hardware decoder 34. When the IFU retrieves a non-native instruction, it routes that instruction to execution units 40 through the hardware decoder. When it retrieves a native instruction, that instruction is routed directly to the execution units, by-passing the hardware decoder. The execution units may include integer and/or floating-point componentry, for example.

Hardware decoder 34 is a logic structure arranged in core 18 and configured to selectively decode instructions for execution in the core. In particular, the hardware decoder decodes non-native instructions retrieved by IFU 24. The hardware decoder parses op-codes, operands, and addressing modes of the non-native instructions, and creates a functionally equivalent, but non-optimized set of native instructions.

Continuing in FIG. 1, execution units 40 receive natively executable instructions, either from IFU 24 or from hardware decoder 34. In one embodiment, microprocessor 12 may be a so-called in-order processor, in which instructions are retrieved and executed in substantially the same order—i.e., without resequencing in the scheduler. In the illustrated embodiment, the execution units also provide hardware support for translation manager 48, as described hereinafter.

As instructions are executed in the execution units of core 18, a sequence of logical and/or arithmetic results evolves therein. The write-back logic of the execution units stores these results in the appropriate registers of the core. In some embodiments, memory access 42 have the exclusive task of enacting store and load operations to and from data memory 16, via L1 data cache 46.

Figure 2:
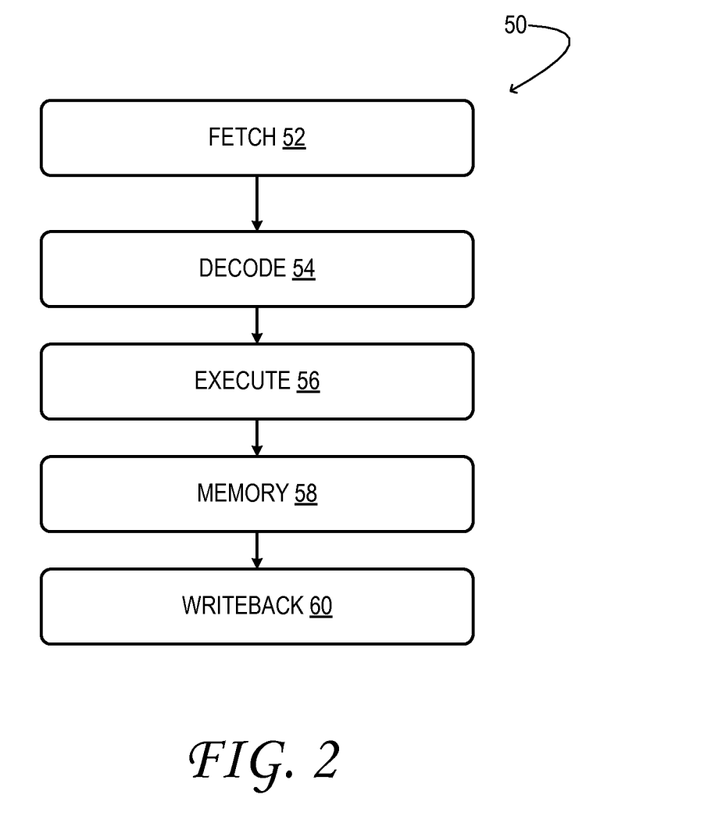
FIG. 2 schematically shows an example processing pipeline in accordance with an embodiment of this disclosure.

The basic functionality of processing system 10 can be represented in the form of a processing pipeline. FIG. 2 schematically shows an example processing pipeline 50. At fetch stage 52, IFU 24 reads a non-native instruction from instruction memory 14. At decode stage 54, hardware decoder 34 decodes the non-native instruction into a corresponding native instruction. At execute stage 56, the execution units compute a logical or numeric result of the instruction. At memory stage 58, data memory 16 is read from or written to, based on the result of the instruction. At writeback stage 60, the appropriate register of the microprocessor core is written to, again based on the result of the instruction.

In some scenarios, pipeline 50 may process only one instruction at a time. The instruction being processed may occupy only one stage of the pipeline, leaving the remaining stages unused during one or more clock cycles. For increased instruction throughput, two or more stages of the pipeline may be used simultaneously, to process two or more instructions. In ideally 'scalar' execution, a first instruction may be fetched, a second instruction decoded, a result of a third instruction computed, that of a fourth instruction committed to memory, and that of a fifth instruction written back to the register file, all in the same clock cycle. No aspect of FIG. 2 should be understood in a limiting sense, for numerous variants are contemplated as well. For instance, execute stage 56 may precede memory stage 58 in some processing systems.

As noted above, processing system 10 may be configured to execute instructions conforming to one or more non-native ISAs in addition to the native ISA of microprocessor 12. One illustrative example of a non-native ISA that processing system 10 may be configured to execute is the 64-bit Advanced RISC Machine (ARM) instruction set; another is the x86 instruction set. Indeed, the full range of non-native ISAs here contemplated includes reduced instruction-set computing (RISC) and complex instruction-set computing (CISC) ISAs, very long instruction-word (VLIW) ISAs, and the like. The ability to execute selected non-native instructions provides a practical advantage for the processing system, in that it may be used to execute code compiled for pre-existing processing systems.

Returning now to FIG. 1, hardware decoder 34 provides the basic logic structure needed to convert a non-native instruction into a functionally equivalent series of native instructions. Processing throughput may be limited, however, by the speed at which the converted but non-optimized code output by the hardware decoder may execute. Therefore, the processing system shown in FIG. 1 also includes translation manager 48. Like the hardware decoder, the translation manager parses the op-codes, operands, and addressing modes of non-native instructions, and creates a functionally equivalent series of native instructions. The translation manager, however, is primarily a software structure; it uses a programmed algorithm executed on core 18 to translate the non-native instructions. In the embodiment of FIG. 1, translator 62 is the core translation service of the translation manager; it may include a dynamic binary translator in one embodiment. The translator and other aspects of the translation manager may reside in instruction memory 14.

Optionally and selectively, translator 62 may optimize as well as translate a specified block 63 of non-native instructions. In particular, the non-native instructions may be converted into functionally equivalent block 64 of native instructions, optimized for speed of execution in processing system 10. Alternatively, or in addition, the translated instructions may be optimized to reduce power consumption. In the embodiments considered herein, various modes of optimization may be available to the translator. These include features common in so-called out-of-order processing systems, such as register renaming and instruction re-ordering, where individual instructions of the optimized block are resequenced relative to corresponding instructions of the non-native block. These features are set forth as non-limiting examples; the translator may employ a wide variety of techniques to produce optimized native translations. Moreover, it will be noted that the term 'block' as used herein can refer to a sequence of instructions of virtually any length; it is not limited to the so-called 'basic-block' as known in the art.

In some embodiments, translation manager 48 may be configured to store the translated and optimized code block 64 in trace cache 66. In the embodiment illustrated in FIG. 1, the trace cache as well as the translation manager reside in carve-out 68—a private, secure portion of instruction memory 14. Each optimized translation in the trace cache may be associated with the IP of the corresponding block of non-native instructions from instruction memory 14. Translation-address cache (THASH) 32 is an on-core hardware redirector that allows IFU 24 to access the translations during execution.

More particularly, IFU 24, on retrieving a non-native instruction, may supply the address of that instruction to THASH 32. The THASH correlates the address of the non-native instruction with the address of the corresponding optimized translation, if such a translation exists. If there is a hit in the THASH, the address of the optimized translation is returned to the IFU, which in turn retrieves the optimized translation from trace cache 66 using that address. The translation is then piped through for execution in the execution units of core 18 without use of hardware decoder 34. At the boundaries of each block of optimized, native code, the translation manager makes available to the programmer a fully compatible architectural set of state.

Figure 3:
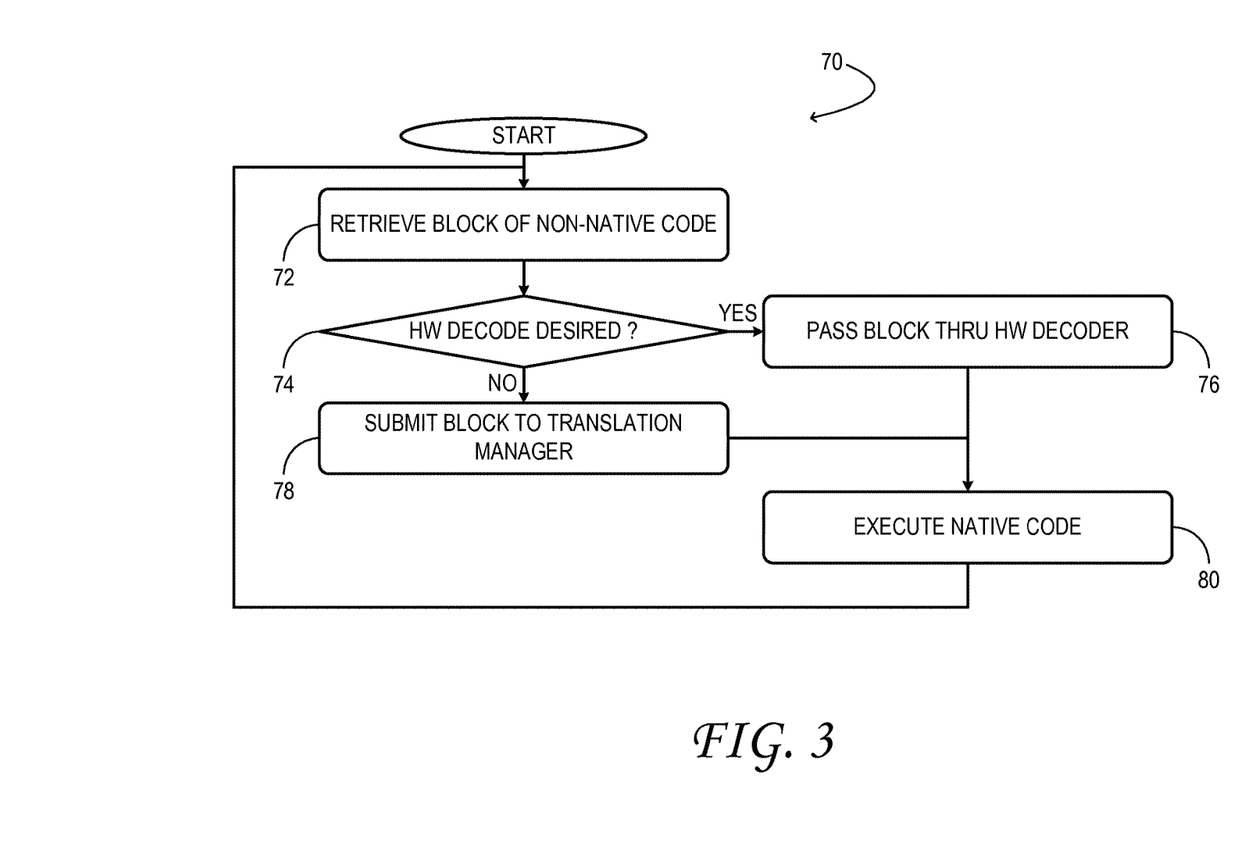
FIG. 3 illustrates a method for executing non-native instruction code in accordance with an embodiment of this disclosure.

FIG. 3 illustrates an example method 70 for executing non-native instruction code in a processing system having both a hardware decoder and a translator. This method is enabled by and described with continued reference to the configurations illustrated herein. It will be understood, however, that the methods here described, and others within the scope of this disclosure, may be enabled by different configurations as well. The methods may be entered upon any time processing system 10 is operating, and may be executed repeatedly. Naturally, each execution of a method may change the entry conditions for a subsequent execution and thereby invoke complex decision-making logic. Such logic is fully contemplated in this disclosure. Further, some of the process steps described and/or illustrated herein may, in some embodiments, be omitted without departing from the scope of this disclosure. The indicated sequence of the process steps may not always be required to achieve the intended results, but is provided for ease of illustration and description. One or more of the illustrated actions, functions, or operations may be performed in parallel, or performed repeatedly, depending on the particular strategy being used.

At 72 of method 70, a block of non-native instruction code is retrieved from instruction memory 14 through the IFU of a microprocessor core. In one embodiment, the instructions retrieved may comprise a code block starting at a branch-target address. At 74 it is determined whether hardware decoding is desired for this block of code. Hardware decoding may be preferred over software translation when the optimization aspect of the software translation is expected to provide relatively little improvement in overall performance. For example, hardware decoding may be preferred if it is predicted that the code block will be executed infrequently, or that there will be an especially high overhead associated with optimized translation. If hardware decoding is desired, then the method advances to 76, where the block retrieved is passed through hardware decoder 34 and decoded for execution in core 18. However, if hardware decoding is not desired, then the method advances to 78, where the block is submitted to translation manager 48. Following appropriate conversion in either the hardware decoder or the translation manager, the native code corresponding to the retrieved block of non-native code is executed, at 80. Thus, instructions translated by the translator are executed without further processing by the hardware decoder. The method then returns to 72, where a subsequent block of non-native code is retrieved.

Naturally, there is a performance overhead associated with creating an optimized translation using the translation manager, which is a software structure. Further, the performance benefit of any optimization may scale with the frequency with which the optimized code is executed in lieu of slower, non-optimized code. It may be advantageous, therefore, to submit frequently executed code for optimization and to decode infrequently executed code in hardware, without optimization.

In principle, a software data structure such as an array may be used to keep track of the frequency of execution of the various blocks of non-native code in instruction memory 14. This array could be stored in off-core memory and contain counts of commonly encountered branch-target addresses and data representing how often they were taken. However, this approach is costly at runtime because every branch instruction encountered by the microprocessor could potentially require redirection to the translation manager, merely to update the array.

To address this issue and provide still other advantages, processing system 10 includes, as shown in FIG. 1, a branch-count manager 82 fabricated within execution units 40 of core 18. The branch-count manager is a microarchitectural logic structure configured to track the usage of the hardware decoder and to trigger translation of non-native blocks after they have been executed via hardware decoding a threshold number of times. In this way, branch-count manager 82 helps translation manager 48 to identify code blocks executed most frequently by the processing system, so that they may be targeted for optimization.

Figure 4:
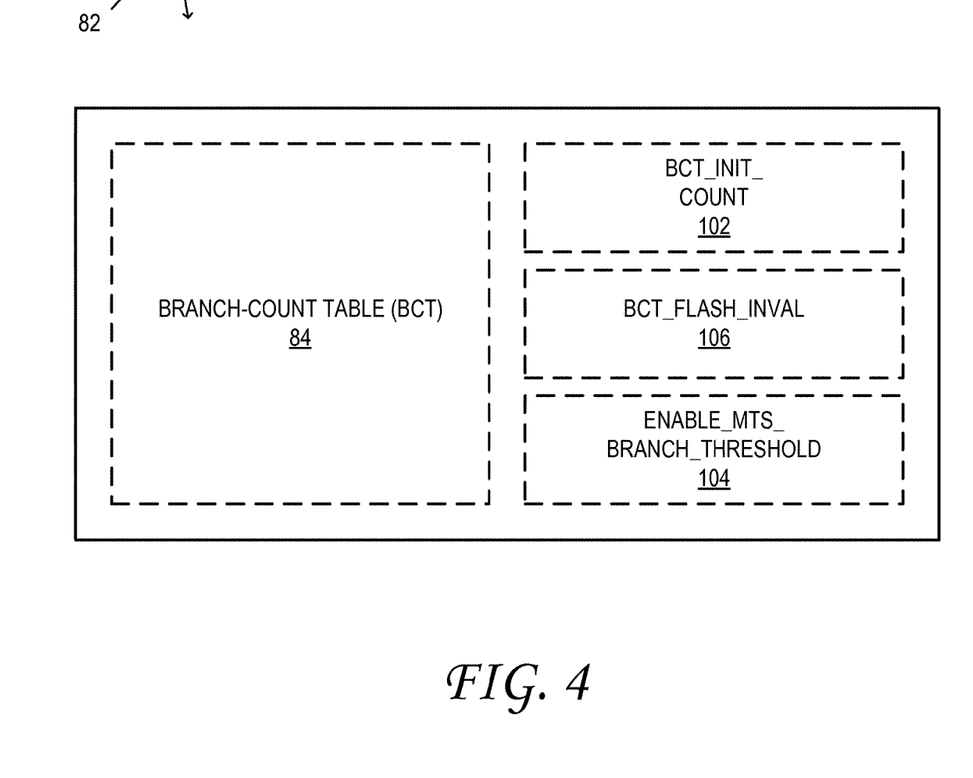
FIG. 4 schematically shows an example branch-count manager in accordance with an embodiment of this disclosure.

FIG. 4 schematically shows an example branch-count manager 82 in one embodiment. The branch-count manager includes branch-count table (BCT) 84, a logic structure arranged within the microprocessor core and configured to track the usage of hardware decoder 34. In one embodiment, the BCT may tally how many times a given block of non-native code is executed through use of the hardware decoder. This structure provides a fast, efficient mechanism to track the usage of the hardware decoder without invoking software, as further described below. Accordingly, translator 62 may be operatively coupled to the BCT and configured to selectively translate non-native instructions for execution in the microprocessor core based on the usage of the hardware decoder, as determined by the BCT.

Figure 5:
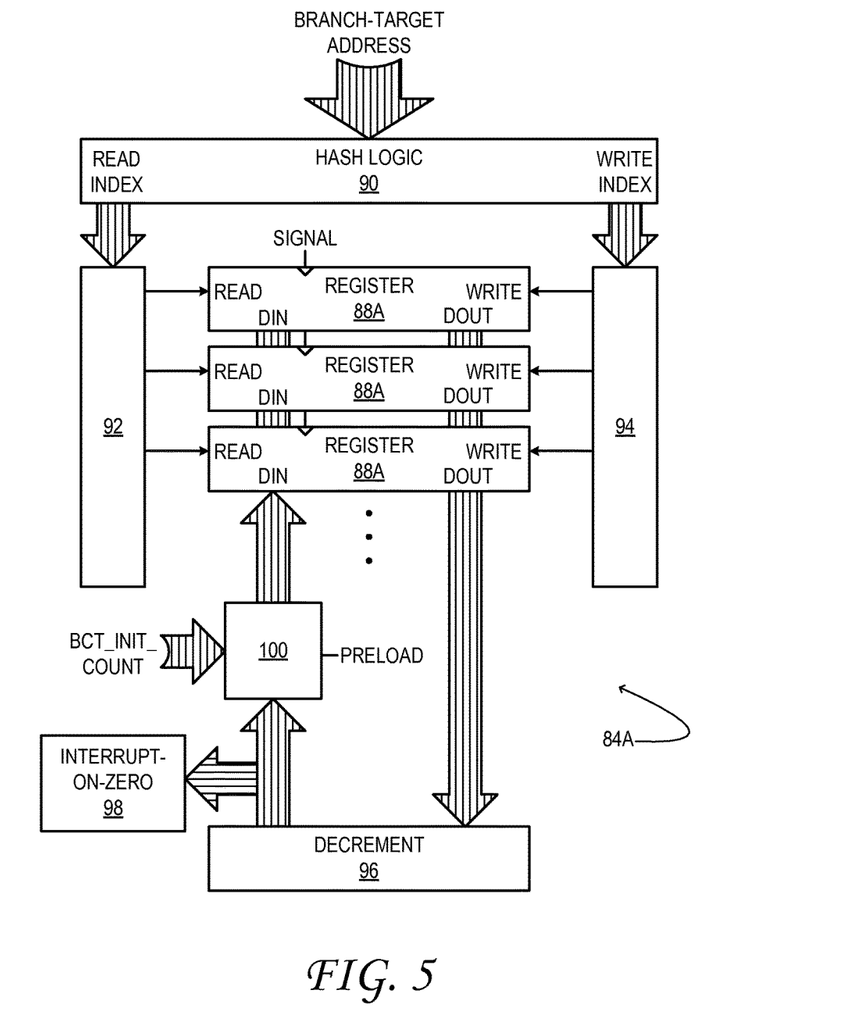
FIGS. 5 and 6 schematically show example branch-count tables in accordance with embodiments of this disclosure.

FIG. 5 schematically shows an example BCT 84A in one embodiment. The illustrated BCT includes a plurality of registers 88A that hold execution tallies of a corresponding plurality of non-native code blocks. In this manner, each of the registers is configured to track the usage of the hardware decoder for its corresponding non-native code block. More particularly, each register may contain a value used to determine when to selectively translate the instructions with the translator. In one non-limiting example, the BCT may include 128 identical registers. Each register may include as many bits as needed to store a number indicating the expected maximum number of times that a branch should be taken before being optimized—eight or ten bits, in some examples.

The registers of BCT 84A are addressable for reading and writing by translation manager 48. Each register 88A is addressable for reading via a read index and for writing via a write index. As noted above, each non-native code block to be translated and optimized may start at a branch-target address. The various registers of the BCT are addressable, accordingly, through one or more hashed forms of the branch-target address. The hashing feature enables mapping of a manageable number of BCT registers to a much larger number of branch target addresses. In the embodiment illustrated in FIG. 5, the read index and the write index correspond to different hashed forms of the branch-target address. BCT 84A includes hash logic 90, configured to hash a given branch target address into a suitable read index and write index. Based on the read index, selection logic 92 enables the selected register for reading. Based on the write index, selection logic 94 enables the selected register for writing.

When a read-enabled register receives a signal indicating that a branch is being taken—e.g., from a common clock line—that signal causes the contents of the register to be output, via a DOUT bus, to decrement unit 96. The decrement unit subtracts one from the tally received therein and provides the decremented tally to the DIN bus. The decremented tally is rewritten back to the same register when that register is write-enabled via selection logic 94. If the decremented value equals zero, then interrupt-on-zero unit 98 generates an interrupt in core 18, which is received by translation manager 48 and may trigger subsequent action, as further described herein. A tally of zero is reached when the branch corresponding to that register has been taken a desired number of times—i.e., when the branch is 'saturated'. In this manner, the BCT may be configured to raise an interrupt in microprocessor 12 when any of the registers reach zero, and to make the branch-target address of the saturating branch available to an interrupt-trapping translation-manager procedure.

FIG. 5 also shows selection logic 100, which, depending on the state of the PRELOAD input, may expose a BCT_INIT_COUNT value to the DIN bus instead of a decremented tally. As noted above, the BCT_INIT_COUNT value is programmable and can be specified by translation manager 48. In this manner, each register of BCT 84A may be preloaded with a value corresponding to the number of times a branch should be taken before an interrupt that triggers optimization is raised.

Figure 6:
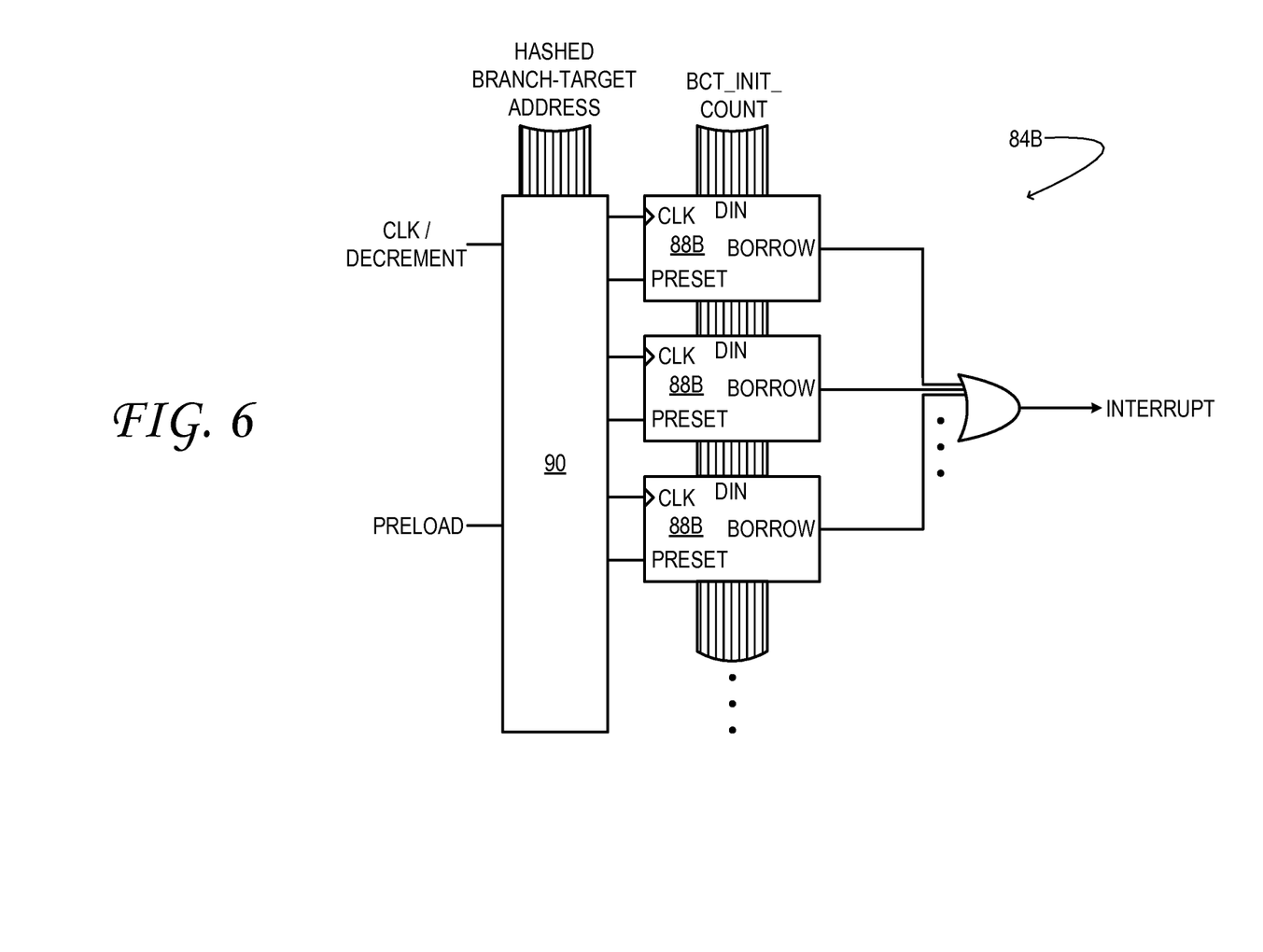

FIG. 6 shows another example BCT 84B in one embodiment. In this embodiment, each register 88B is an n-bit binary down counter (eight-bit, ten-bit, etc.) configured to decrement upon being read. Via selection logic 90, each counter may be pre-loaded with a BCT_INIT_COUNT of one less than the desired number of times that the corresponding branch should be taken before being optimized. In the embodiment illustrated in FIG. 6, a counter underflows (generates a borrow) when the desired number of executions of the corresponding branch has been reached—i.e., when the branch is 'saturated'. Accordingly, an interrupt is raised when a borrow is generated by any of the counters. Naturally, other BCT embodiments are contemplated as well. For example, a counter in the BCT may be configured to increment instead of decrement, and to raise an interrupt when a carry is generated by any of the counters.

Returning now to FIG. 4, branch-count manager 82 includes BCT_INIT_COUNT register 102, ENABLE_MTS_BRANCH_THRESHOLD register 104, and BCT_FLASH_INVAL register 106. These registers present an interface to translation manager 48 for controlling BCT 84.

The BCT_INIT_COUNT register is a data register configured to store an initial count value for each register of BCT 84. The ENABLE_MTS_BRANCH_THRESHOLD register is a control register configured to store a boolean value reflecting whether the BCT can generate an interrupt. The BCT interrupt may be suppressed, for example, when one or more optimizations have been scheduled but not completed. The BCT_FLASH_INVAL register is a control register that, when written with a true boolean value, triggers all entries in the logic structure to be invalidated and restored to their respective initial count values.

Figure 7:
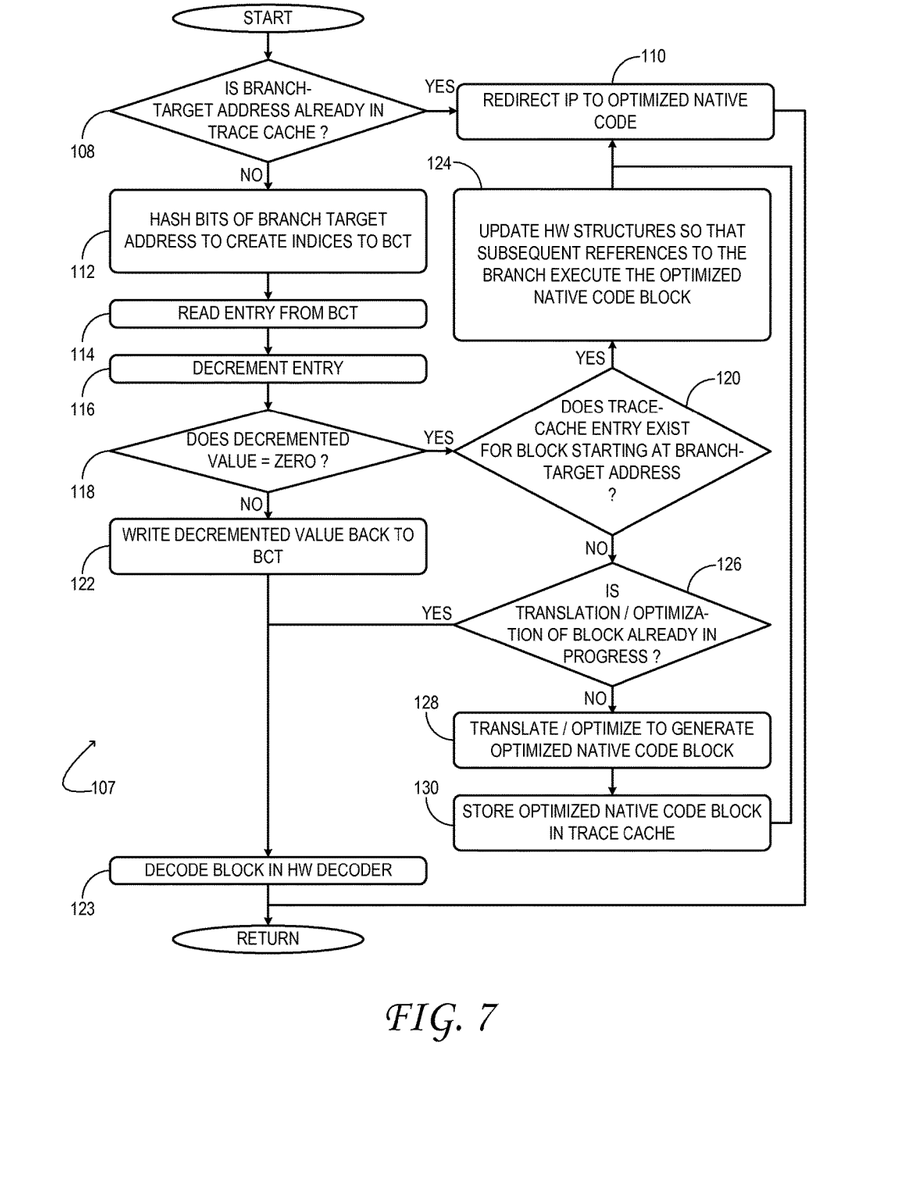
FIG. 7 illustrates another method for executing non-native instruction code in accordance with an embodiment of this disclosure.

FIG. 7 illustrates another example method 107 for executing non-native instruction code. At the outset of execution, IFU 24 will have retrieved a branching instruction directing the IP to a branch-target address, which defines the initial address of the non-native code block received. The terminal address, or the length of the block, may be defined by a subsequent branching instruction or by a return instruction.

At 108 of method 78 it is determined whether the branch-target address is already stored in THASH 32. If the branch-target address is already stored in the THASH, then the method advances to 110, where the IP is redirected to the optimized translation corresponding to the non-native code block received. In this manner, the optimized native code block is executed by the processing system without further use of the hardware decoder.

However, if the branch-target address is not already stored in the trace cache, then the method advances to 112. At 112 various bits of the branch-target address are hashed to create a read index and a write index to the appropriate register of BCT 84. In one embodiment, the read index and the write index may be different indices. At 114 an entry corresponding to the read address is read from the BCT. At 116 this entry is decremented in value—e.g., decremented by one. At 118 it is determined whether the decremented value is equal to zero. The presence of a zero value in the register may be a condition for causing the BCT to invoke the translator. In one non-limiting example, the translator may be invoked by raising an interrupt in the processing system.

In the illustrated example, if the decremented value is equal to zero, then the method advances to 120; otherwise the method advances to 122, where the decremented value is written back to the BCT at the write index computed at 112. Then, at 123, the non-native block of code is decoded in the hardware decoder and executed. In this manner, an appropriate register of the BCT tallies how many times the hardware decoder has decoded the code block.

It will be noted that the operational details of method 78 should not be understood in a limiting sense, for numerous variations are contemplated as well. At 116, for instance, the contents of the register may by incremented instead of decremented. In some examples, accordingly, underflow or overflow of the register may be a condition for invoking the translator.

Continuing in FIG. 7, at 120, when the decremented count value equals zero, it is then determined whether a trace-cache entry already exists for instructions starting at the specified branch-target address. If a trace-cache entry does exist for such instructions, then the method advances to 124, where hardware structures within microprocessor 12 may be updated so that subsequent references to the branch execute the optimized, native code block. At this point in the method, execution continues at 110, where the IP is redirected to the optimized native code. However, if no appropriate trace-cache entry exists, then the method advances to 126.

At 126 it is determined whether translation and optimization of the code block is already in progress. If translation and optimization are already in progress, then the method advances to 123, where the hardware decoder is invoked to avoid having to wait for the optimization to be completed; otherwise, the method advances to 128. In this and other embodiments, the decision at 126 may reflect other conditions that influence whether a non-native code block should or should not be translated/optimized at this point.

At 128 the code block is translated and optimized to generate an optimized, native code block using translator 62 (FIG. 1), for example. Thus, after the hardware decoder has decoded the instructions a threshold number of times, and provided that no corresponding optimized code already exists, translation manager 48 translates the non-native code block into an optimized, native code block. As noted above, the ordering of the method steps may differ in the various embodiments of this disclosure. For instance, 128 and 130 may be executed in parallel in some examples, with code continuing to execute through the hardware decoder.

At 130 the optimized native code block is stored in trace cache 66 for subsequent execution in the processing system. From this point, execution of the method continues at 110, where the IP is redirected to the optimized native code.

It will be understood, that the systems and methods described hereinabove are embodiments of this disclosure—non-limiting examples for which numerous variations and extensions are contemplated as well. Accordingly, this disclosure includes all novel and non-obvious combinations and sub-combinations of the such systems and methods, as well as any and all equivalents thereof.

The invention claimed is:

1. A processing system comprising:
   a microprocessor core;
   a hardware decoder arranged within the microprocessor core and configured to selectively decode instructions for execution in the microprocessor core;
   a logic structure arranged within the microprocessor core and configured to track usage of the hardware decoder, wherein:
     the logic structure comprises a table comprising a plurality of registers, each respective register pre-loaded with an initial count value decremented each time a respective non-native code block has been uniquely decoded by the hardware decoder, the pre-loaded initial count value dependent on the respective non-native code block; and
     a first register in the plurality of registers is pre-loaded with a first initial count value and a second register in the plurality of registers is pre-loaded with a second initial count value, where the first initial count value and the second initial count value are different; and
   a translator operatively coupled to the logic structure and configured to selectively translate the respective non-native code block for execution in the microprocessor core when the respective register is decremented to zero.

2. The processing system of claim 1 wherein the translator comprises a dynamic binary translator.

3. The processing system of claim 1 wherein the translator is further configured to enact one or more of:
   selectively optimizing the instructions for speed of execution;
   selectively renaming a register of the microprocessor core; and
   selectively resequencing the instructions.

4. The processing system of claim 1 further comprising an execution unit configured to execute the instructions as translated by the translator and to execute the instructions as decoded by the hardware decoder, and wherein the instructions, when translated by the translator, are executed in the execution unit without further processing by the hardware decoder.

5. The processing system of claim 1 wherein each of the respective registers comprises an n-bit binary counter configured to decrement a-value of the respective register upon being read.

6. The processing system of claim 1 wherein a condition for invoking the translator includes underflow, overflow, or nulling of the value in the register.

7. The processing system of claim 1 wherein the instructions comprise a code block starting at a branch-target address, and wherein each of the respective registers is addressable through one or more hashed forms of the branch-target address.

8. The processing system of claim 7 wherein each of the respective registers is addressable for reading and writing through different hashed forms of the branch-target address.

9. The processing system of claim 1 wherein each of the respective registers is addressable through hashed forms of branch-target addresses of a corresponding plurality of code blocks.

10. The processing system of claim 9 wherein the microprocessor core comprises a control register to specify whether the logic structure is able to invoke the translator.

11. The processing system of claim 9 wherein the microprocessor core comprises a control register to specify whether all registers in the logic structure are to be invalidated and restored to their respective initial count values.

12. In a processing system having a microprocessor core, a hardware decoder arranged within the microprocessor core, and a translator, a method comprising:
   with the hardware decoder, decoding instructions for execution in the microprocessor core;
   in a logic structure arranged within the microprocessor core, tallying how many times the hardware decoder has decoded the instructions, wherein:
      the logic structure comprises a table comprising a plurality of registers, each respective register pre-loaded with an initial count value decremented each time a respective non-native code block has been uniquely decoded by the hardware decoder, the pre-loaded initial count value dependent on the respective non-native code block; and
      a first register in the plurality of registers is pre-loaded with a first initial count value and a second register in the plurality of registers is pre-loaded with a second initial count value, where the first initial count value and the second initial count value are different;
   translating and optimizing the respective non-native code block for execution in the microprocessor core when the respective register is decremented to zero; and
   storing the instructions as translated in a trace cache for execution by the processing system.

13. The method of claim 12 further comprising executing the instructions as translated without further processing by the hardware decoder.

14. The method of claim 12 wherein each of the non-native code blocks begin at a respective branch-target address and wherein each of the respective registers is addressable through one or more hashed forms of the respective branch-target address.

15. The method of claim 14 further comprising hashing the respective branch-target address to obtain an address for writing to the respective register.

16. The method of claim 14 further comprising decrementing a value of the respective register upon reading the respective register.

17. The method of claim 14 further comprising hashing the respective branch-target address to obtain an address for reading the respective register.

18. In a processing system having a microprocessor core, a hardware decoder arranged within the microprocessor core, and a translator, a method comprising:
   with the hardware decoder, decoding a non-native block of instruction code for execution in the microprocessor core, the non-native block of instruction code associated with a respective branch-target address;
   in a logic structure arranged within the microprocessor core, tallying a number of times that the hardware decoder decodes the non-native block of instruction code, the logic structure comprising a table comprising a plurality of registers addressable through one or more hashed forms of the branch-target address, wherein:
      each of the registers pre-loaded with an initial count value decremented each time the hardware decoder uniquely decodes a respective non-native block of instruction code, the pre-loaded initial count value dependent on the non-native code block of instruction code; and
      a first register in the plurality of registers is pre-loaded with a first initial count value and a second register in the plurality of registers is pre-loaded with a second initial count value, where the first initial count value and the second initial count value are different;
   raising an interrupt in the microprocessor when any of the plurality of registers underflows or holds a zero;
   in response to the interrupt being raised, translating and optimizing a respective non-native block of instruction code for execution via the translator; and storing the respective non-native block of instruction code, as translated, in a trace cache for subsequent execution by the processing system.

* * * * *